J. LYNAH.
PROCESS OF PRODUCING ARTIFICIAL LEATHER AND PRODUCT THEREOF.
APPLICATION FILED OCT. 23, 1915.
1,350,281.
Patented Aug. 17, 1920.
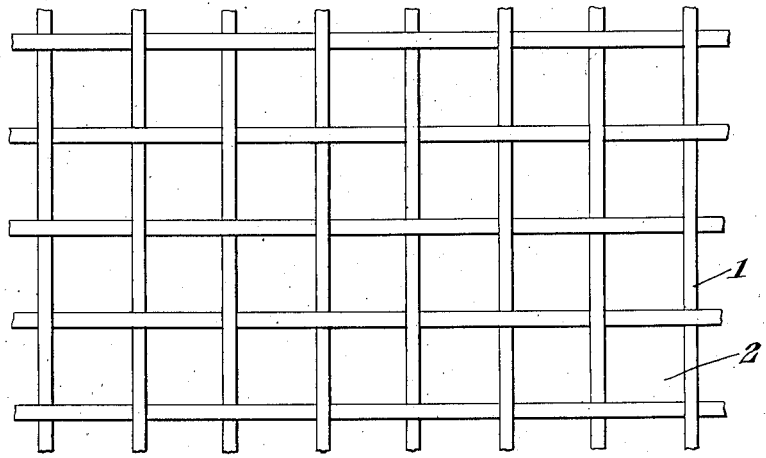
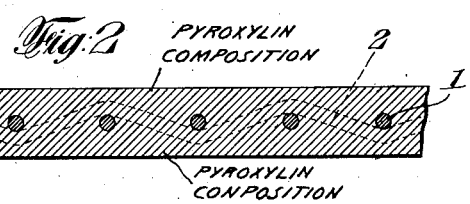
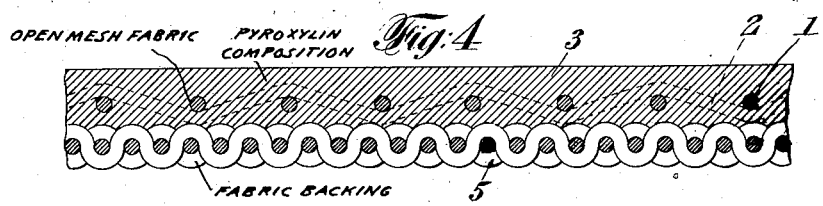
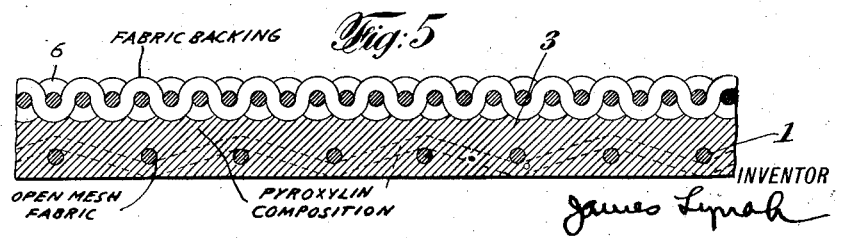

UNITED STATES PATENT OFFICE.

JAMES LYNAH, OF NEWBURGH, NEW YORK, ASSIGNOR TO DU PONT FABRIKOID COMPANY, OF WILMINGTON, DELAWARE, A CORPORATION OF DELAWARE.

PROCESS OF PRODUCING ARTIFICIAL LEATHER AND PRODUCT THEREOF.

1,350,281.  Specification of Letters Patent.  Patented Aug. 17, 1920.

Application filed October 23, 1915. Serial No. 57,418.

*To all whom it may concern:*

Be it known that I, JAMES LYNAH, of Newburgh, in the county of Orange and in the State of New York, have invented a certain new and useful Improvement in Processes of Producing Artificial Leather and Products Thereof, and do hereby declare that the following is a full, clear, and exact description thereof.

My invention relates to a process of producing coated fabrics whereby an artificial leather of great efficiency and high quality is produced, and the product thereof.

Hitherto it has been customary in producing artificial leather to apply a layer of coating material upon the surface of a fabric, usually a woven fabric, which fabric was so constructed that the layer of coating material merely adhered to the surface thereof. This was due to the fact that the fibers of the fabric used were located close together. The product thus previously produced comprised a body of fabric having adhering to the surface thereof a layer of the coating material. Artificial leather thus constructed was comprised of a comparatively weak outer surface and a comparatively strong under surface, the weaker portion being the layer of coating material and the stronger portion being the fabric to the surface of which it adheres. Furthermore there was a more or less weak bond of union between the layer of coating material and the body of fabric.

The object of my invention is to provide a process, and the product thereof, in which a stronger and more efficient artificial leather is produced by literally embedding a fabric in the body of coating material contained in the artificial leather, and in order to accomplish this end I make use of an open mesh woven fabric which enables the layer of coating material to penetrate into the interstices in the fabric so that where layers of the coating material are present on both surfaces of the woven fabric, the two layers of coating material will be firmly united together by portions of the coating material extending through the body of the fabric, and united to the layers of the coating material on the opposite sides of the fabric.

A further object of my invention is to provide a similar process and product in which where only one surface of the open mesh fabric is provided with a layer of the coating material, the coating material will in a similar way be anchored to the fabric by portions of the coating material extending into and preferably interlocking with the recesses in the open mesh fabric.

While many different products may be produced in accordance with my invention, for the purpose of illustration I have shown only two forms of my invention in the accompanying drawings, in which—

Figure 1 is a plan view of a body of woven fabric which may be used in accordance with my invention to produce the artificial leather described herein;

Fig. 2 is a transverse section of a piece of artificial leather made in accordance with my invention in which there are layers of coating material on both surfaces of the open mesh fabric and which are anchored to the same by portions of the coating material extending through the meshes in the fabric;

Fig. 3 is a similar section of a modified form of product produced in accordance with my invention in which product the open mesh fabric is provided with a layer of the coating material on only one surface thereof and in which portions of the body of the coating material extend into and interlock with the meshes of the fabric;

Fig. 4 is a similar section of the modification shown in Fig. 3, with a backing of fabric applied to the surface of the open mesh fabric which is uncoated; and Fig. 5 is a similar section of the product produced by the application of a fabric backing to the coated surface of the modification shown in Fig. 3.

In Figs. 1 and 2 I have shown an open mesh woven fabric 1, which may be of silk, cotton, wool or any other fabric, having openings 2 therein. In this form of my invention the fabric 1 is preferably provided on one side with a layer 3 of coating material which may be of any desired kind, as for example, a pyroxylin composition, a composition containing drying oils, or a rubber composition, the same being preferably applied in the form of a jelly by means of a doctor blade. In the case where I use a pyroxylin composition, the composition used for coating purposes may be composed of the following constituents in the proportions indicated:

| | |
|---|---|
| Nitro cellulose | 10% |
| Benzol | 40% |
| Ethyl acetate | 28% |
| Castor oil | 17% |
| Pigment | 5% |

The coating of the fabric in this manner will not only provide one surface of the fabric with a body of coating material, but said coating material will enter into the openings in the open mesh fabric so as to anchor the coating to the fabric by the interlocking of said portions of the coating material with the openings in said fabric. Thereafter a coating 4 of the coating material which may be any one of the coating materials above referred to, is applied to the other surface of the open mesh fabric 1. This is preferably done in such a manner and at such a time as to unite the layer of coating material 4 with the portions of the layer 3 which extend into and through the openings in the open mesh fabric 1 so that preferably there is produced in this manner substantially a unitary body of coating material in the interior of which the open mesh fabric 1 is embedded.

If desired, in order to provide a greater thickness to the product, a layer 5 of fabric may be cemented to the product produced as indicated above, for which purpose any cementing material may be used. In case, however, the coating material is the pyroxylin composition above referred to, the cementing material may be composed of the following constituents in the proportions given:

| | | |
|---|---|---|
| Nitrocellulose | 1.50 | parts. |
| Benzol | 4.35 | " |
| Ethyl acetate | 2.90 | " |
| Castor-oil | 3.75 | " |

In the modified form of the product shown in Fig. 3, said product may be produced in the same way as the product already previously described herein and shown at Fig. 2, except that the layer of coating material 4 is omitted, and except that a backing 6 of fabric may be applied to one or the other of the surfaces of the product thus formed and shown in Fig. 3. When the backing of fabric is applied in this manner to the modification shown in Fig. 3, the products such as those shown in Figs. 4 and 5 are produced.

The fabric backings 5 and 6 may be of any suitable material, as for example, a sheeting drill, sateen or felt.

In my invention it is to be understood that it is not essential to make use of any particular fabric and it is not essential to make use of any particular composition.

While I have described my invention above in detail I wish it to be understood that many changes may be made therein without departing from the spirit of my invention.

I claim:

1. The process which comprises embedding an open mesh woven textile fabric in a coating composition, and then combining the same with a fabric backing.

2. The process which comprises embedding an open mesh woven fabric in a coating composition by applying said composition to one surface thereof, and then combining the same with a fabric backing.

3. The process which comprises embedding an open mesh textile fabric in a coating composition by applying said composition to both surfaces thereof, and then combining the same with a fabric backing.

4. The process which comprises embedding an open mesh woven textile fabric in a coating composition, by applying said composition to both surfaces thereof, and then combining the same with a fabric backing.

5. The process which comprises embedding a fabric in a pyroxylin coating composition by applying said composition to both surfaces thereof, and then combining the same with a fabric backing.

6. The process which comprises embedding an open mesh fabric in a pyroxylin coating composition by applying said composition to both surfaces thereof, and then combining the same with a fabric backing.

7. The process which comprises embedding a woven fabric in a pyroxylin coating composition by applying said composition to both surfaces thereof, and then combining the same with a fabric backing.

8. An artificial leather comprising a fabric embedded in a coating composition, and having a fabric backing.

9. An artificial leather comprising an open mesh fabric embedded in a coating composition, and having a fabric backing.

10. An artificial leather comprising a fabric embedded in a coating composition, said composition being located on one surface of the fabric, and having a fabric backing.

11. An artificial leather comprising an open mesh fabric embedded in a coating composition, said composition being located on one surface of the fabric, and having a fabric backing.

12. An artificial leather comprising a woven fabric embedded in a coating composition, said composition being located on one surface of the fabric, and having a fabric backing.

13. An artificial leather comprising a fabric embedded in a coating composition, said composition being located on both surfaces of the fabric, and having a fabric backing.

14. An artificial leather comprising an open mesh fabric embedded in a coating composition, said composition being located on both surfaces of the fabric, and having a fabric backing.

15. An artificial leather comprising a fabric embedded in a pyroxylin coating composition, said composition being located on both surfaces of the fabric, and having a fabric backing.

16. An artificial leather comprising an open mesh fabric embedded in a pyroxylin coating composition, said composition being located on both surfaces of the fabric and having a fabric backing.

17. An artificial leather comprising a woven fabric embedded in a pyroxylin coating composition, said composition being located on both surfaces of the fabric, and having a fabric backing.

18. An artificial leather comprising a backing, a coating of pyroxylin composition thereon, and means embedded in said coating for reinforcing the same.

In testimony that I claim the foregoing I have hereunto set my hand.

JAMES LYNAH.

Witnesses:
ELIZABETH B. LYNAH,
GERTRUDE E. HECTUS.